United States Patent
Shioji et al.

(10) Patent No.: US 11,575,300 B2
(45) Date of Patent: Feb. 7, 2023

(54) ELECTRIC MOTOR MANUFACTURING METHOD AND ELECTRIC MOTOR MANUFACTURING DEVICE

(71) Applicant: NISSAN MOTOR CO., LTD., Yokohama (JP)

(72) Inventors: Yoshiyuki Shioji, Kanagawa (JP); Kunitomo Ishiguro, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 12 days.

(21) Appl. No.: 17/047,120

(22) PCT Filed: Apr. 16, 2018

(86) PCT No.: PCT/JP2018/015634
§ 371 (c)(1),
(2) Date: Oct. 13, 2020

(87) PCT Pub. No.: WO2019/202624
PCT Pub. Date: Oct. 24, 2019

(65) Prior Publication Data
US 2021/0159766 A1    May 27, 2021

(51) Int. Cl.
*H02K 15/10*   (2006.01)
*H02K 3/34*    (2006.01)
*H02K 3/38*    (2006.01)

(52) U.S. Cl.
CPC .............. *H02K 15/10* (2013.01); *H02K 3/345* (2013.01); *H02K 15/105* (2013.01); *H02K 3/38* (2013.01)

(58) Field of Classification Search
CPC ............................... H02K 15/10; H02K 3/345
See application file for complete search history.

(56) References Cited

FOREIGN PATENT DOCUMENTS

| JP | 61-185046 A | 8/1986 |
|----|----|----|
| JP | 2004-364449 A | 12/2004 |
| JP | 2007-37330 A | 2/2007 |
| JP | 2007-104785 A | 4/2007 |
| JP | 2007104785 A * | 4/2007 |
| JP | 2009-219198 A | 9/2009 |

* cited by examiner

*Primary Examiner* — Livius R. Cazan
(74) *Attorney, Agent, or Firm* — Foley & Lardner LLP

(57) ABSTRACT

An inter-phase insulating paper is inserted, using a guide jig, into slots formed in the inner circumferential surface of a stator core. The guide jig is disposed at a predetermined position on one end surface side of the stator core. The inter-phase insulating paper is inserted into the guide jig along the stator core central axis line. The guide jig deforms the inter-phase insulating paper to a predetermined shape when the inter-phase insulating paper passes through the inside of the guide jig. The guide jig inserts both side portions of the inter-phase insulating paper simultaneously into different two slots of the stator core along the stator core central axis line.

15 Claims, 20 Drawing Sheets

ELECTRIC MOTOR MANUFACTURING METHOD AND ELECTRIC MOTOR MANUFACTURING DEVICE

TECHNICAL FIELD

The present invention relates to an electric motor manufacturing method and an electric motor manufacturing device.

BACKGROUND ART

Patent Document 1 discloses an interphase insulator insertion device structured to mount an interphase insulator to an inner periphery of a stator core, by using a holder structured to suckingly hold the interphase insulator at a predetermined position on an outer periphery of the holder. The interphase insulator is composed of a pair of insulation papers and a pair of connectors coupling the pair of insulator papers.

The interphase insulator insertion device presses and deforms the interphase insulator onto the outer periphery of the holder by using an insulator supply unit retaining the interphase insulator, such that the holder suckingly holds the interphase insulator at the predetermined position on the outer periphery.

Then, the interphase insulator insertion device moves the holder suckingly holding the interphase insulator to a predetermined position inside the stator core, and pushes and mounts the interphase insulator to the inner periphery of the stator core inside the stator core, and mounts the interphase insulator to the inner periphery of the stator core.

However, the interphase insulator insertion device disclosed in Patent Document 1 performs the suction hold of the interphase insulator by the holder with the interphase insulator deformed, before insertion of the holder into the stator core.

This forces the interphase insulator insertion device of Patent Document 1 to require time for setting the interphase insulator to the holder, and simultaneously may cause position displacement of the interphase insulator upon the setting to the holder. Accordingly, there is still room for improvement in view of productivity.

PRIOR ART DOCUMENT(S)

Patent Document(s)

Patent Document 1: JP S61-185046 A

SUMMARY OF THE INVENTION

Problem(s) to be Solved by the Invention

An electric motor includes a stator core and an interphase insulation paper. The stator core includes an inner periphery to which coils for respective phases are mounted, and includes slots formed in the inner periphery. The interphase insulation paper is structured to perform insulation between the coils in their coil ends. The interphase insulation paper is inserted into the slots of the stator core by using a guide jig. The guide jig receives the interphase insulation paper inserted into the guide jig in parallel with the stator core central axis. The interphase insulation paper passing through the guide jig is deformed into a predetermined shape, and both side portions of the interphase insulation paper that has passed through the guide jig are inserted respectively and simultaneously into different two of the slots of the stator core in parallel with the stator core central axis.

The present invention serves to insert an interphase insulation paper into a stator core accurately within a reduced time.

MODE(S) FOR CARRYING OUT THE INVENTION

The following details an embodiment of the present invention with reference to the drawings.

Figure 1:
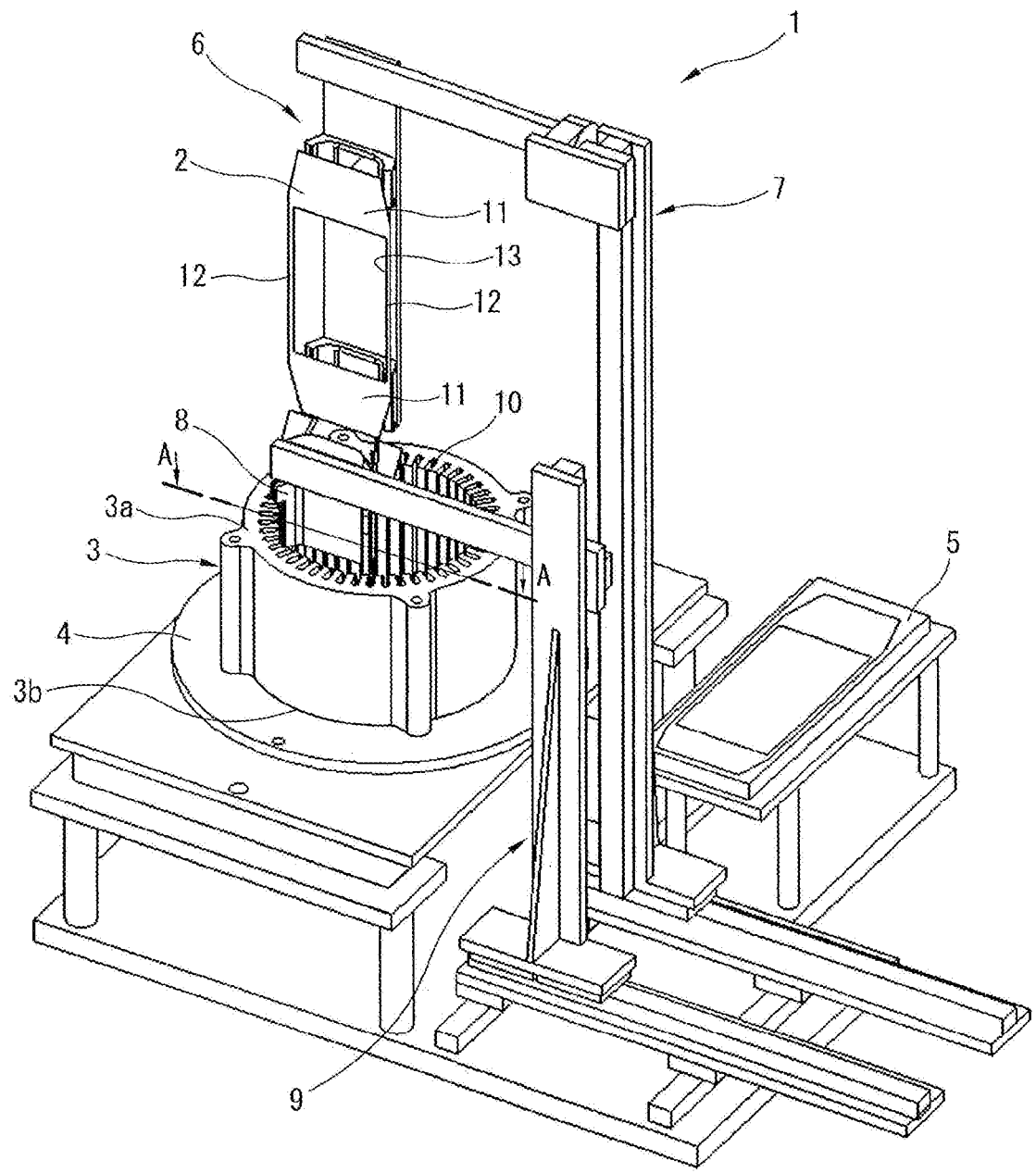
FIG. 1 is an illustrative view schematically showing an electric motor manufacturing device according to the present invention.

FIG. 1 is an illustrative view schematically showing an electric motor manufacturing device according to the present invention, which also schematically shows an insulation paper insertion device 1 used for inserting an interphase insulation paper 2 into an stator core 3 of an electric motor. Interphase insulation paper 2 is an insulation paper made of insulating material.

Interphase insulation paper 2 is structured to perform insulation between coils in coil ends 62 (see FIG. 23 described below) of the coils, wherein coil ends 62 are disposed outside with respect to end faces (i.e. a first end face 3a and a second end face 3b) of stator core 3 in a direction of a stator core central axis Lt. Accordingly, the insertion of interphase insulation paper 2 into stator core 3 are actually implemented during processes for winding the coils for respective phases onto stator core 3: e.g., coils for U phase, V phase, and W phase in case of a three-phase alternating current motor. However, the coils are omitted from FIG. 1 for convenience of explanation. Also FIGS. 4A to 12 are drawn without the coils for convenience of explanation.

Insulation paper insertion device 1 includes: a support base 4 supporting the stator core 3; an insulation paper storage case 5 structured to store interphase insulation paper 2; an insertion jig 6 structured to insert interphase insulation paper 2 into stator core 3 in parallel with stator core central axis Lt; an insertion jig movement mechanism 7 that is a part of a jig movement mechanism and is structured to move insertion jig 6; a guide jig 8 structured to assist the insertion of interphase insulation paper 2 into stator core 3; and a guide jig movement mechanism 9 that is a part of the jig movement mechanism and is structured to move guide jig 8.

Insertion jig movement mechanism 7 and guide jig movement mechanism 9 operate using as a drive source an actuator (not shown) such as a motor disposed outside of stator core 3.

Stator core 3 has a cylindrical tubular shape, and includes slots 10 formed in an inner periphery of stator core 3. Stator core 3 is formed as a lamination of multiple ring-shaped members made of electromagnetic steel sheet, for example.

Stator core 3 is configured such that the coils for respective phases are mounted to the inner periphery of stator core 3. In the present description, the coils are not shown in the drawings involving the stator core 3 for convenience of explanation, except for FIG. 23 described below.

Each of slots 10 is a recessed member with a U-shaped cross section, and continuously extends from first end face 3a to second end face 3b of stator core 3 in the direction of stator core central axis Lt. Slots 10 are arranged at equal intervals in a circumferential direction of stator core 3.

Figure 2:
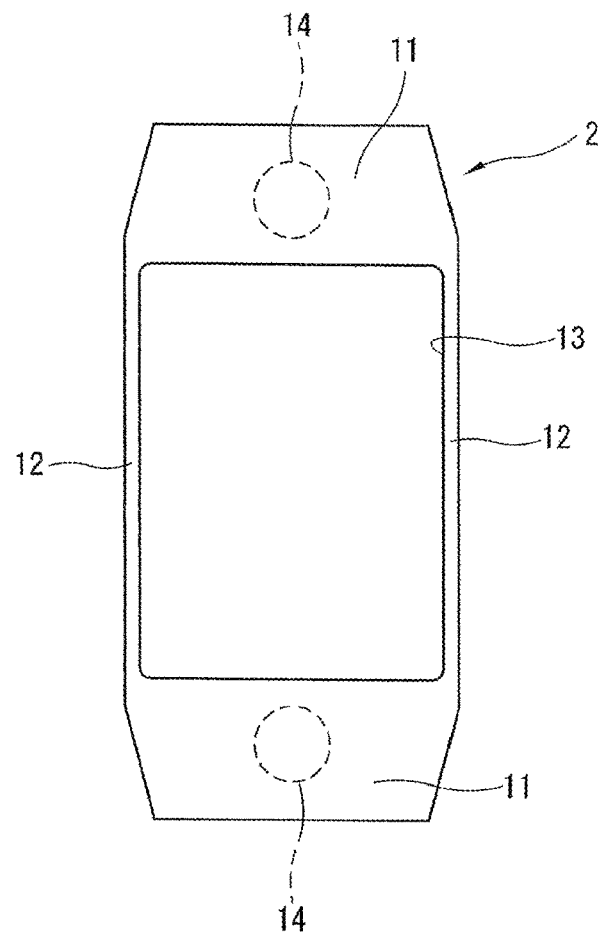
FIG. 2 is a plan view showing an example of an interphase insulation paper.

As shown in FIGS. 1 and 2, interphase insulation paper 2 includes a pair of insulators 11 apart from each other and a pair of legs 12 apart from each other, wherein the pair of legs 12 couple the pair of insulators 11. Interphase insulation paper 2 further includes an opening 13 with a rectangular shape which is surrounded by the pair of insulators 11 and the pair of legs 12. Accordingly, interphase insulation paper 2 has a shape of substantially rectangular frame.

Each of insulators 11 is shaped to decrease in width toward an end of the each of insulators 11 by partially cutting off both side portions of the end. In other words, each of insulators 11 has a substantially trapezoidal shape decreasing in width toward the end.

The pair of legs 12 are connected to both sides of each of insulators 11. Each of legs 12 is to be inserted in a corresponding one of slots 10, and has a length greater than a length of stator core 3 in the direction of stator core central axis Lt (see FIG. 4 described below). Furthermore, each of legs 12 has a width less than a width of each slot 10 in the circumferential direction of stator core.

Opening 13 includes four corners each of which is rounded and curved to be convex outwardly at a predetermined curvature. In other words, opening 13 includes junctions at each of which one of insulators 11 and one of legs 12 are connected to each other, wherein each of the junctions is curved to be convex outwardly at the predetermined curvature.

Interphase insulation paper 2 has a thickness of approximately 0.2 mm, for example.

Figure 3:
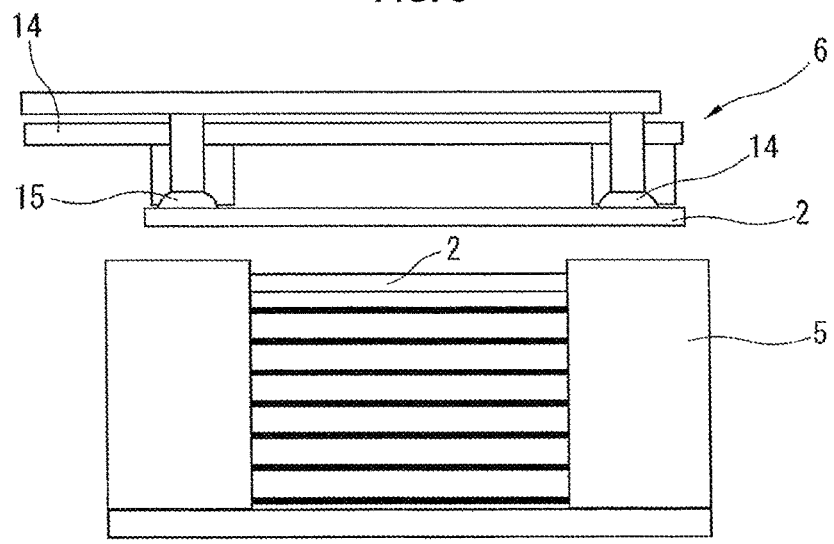
FIG. 3 is an illustrative view schematically showing a process for sucking the interphase insulation paper with an insertion jig.

FIG. 3 is an illustrative view schematically showing a process for sucking the interphase insulation paper 2 with insertion jig 6.

As shown in FIG. 3, insertion jig 6 includes a pair of vacuum pads 14 structured to respectively suck and hold the pair of insulators 11 of interphase insulation paper 2 stored in insulation paper storage case 5. Specifically, as shown by broken lines in FIG. 2, each of vacuum pads 14 suckingly holds a central portion of a corresponding one of insulators 11. Each of vacuum pads 14 utilizes negative pressure to suck interphase insulation paper 2. In addition, it may be configured such that each of insulators 11 of interphase insulation paper 2 is sucked and held by a plurality of vacuum pads 14.

The configuration that each of insulators 11 is sucked and held by the plurality of vacuum pads 14 improves insertion jig 6 in stability to hold interphase insulation paper 2, although even the configuration that each of insulators 11 is sucked and held by one of vacuum pad 14 provides insertion jig 6 with enough stability to hold interphase insulation paper 2.

Thus, insertion jig 6 may hold at least one portion of each of insulators 11. In other words, one portion or a plurality of portions of each of insulators 11 may be held by insertion jig 6.

Figure 4A:
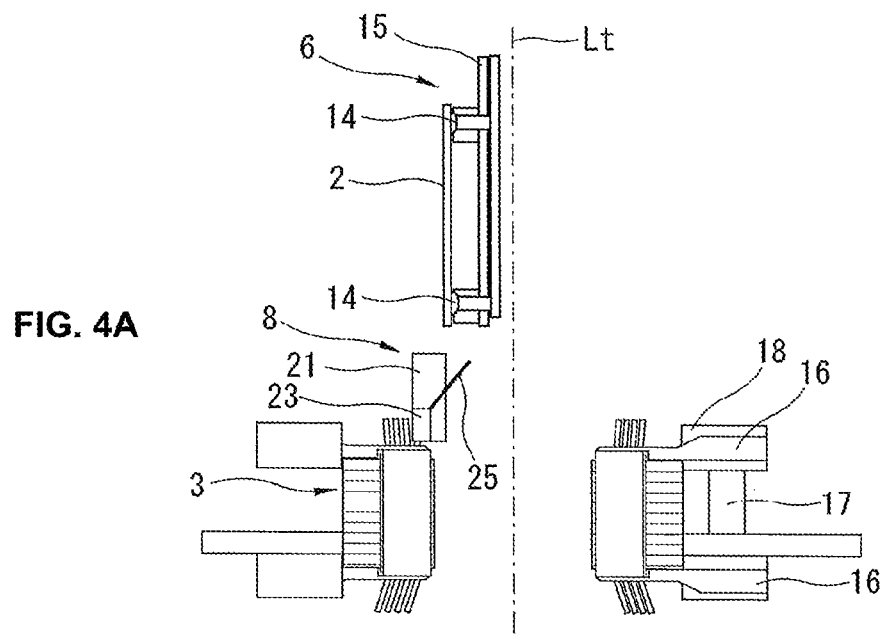
FIGS. 4A, 4B, and 4C are illustrative views chronologically showing movement of the insertion jig and a guide jig during processes for insertion of the interphase insulation paper into a stator core.
Figure 4B:
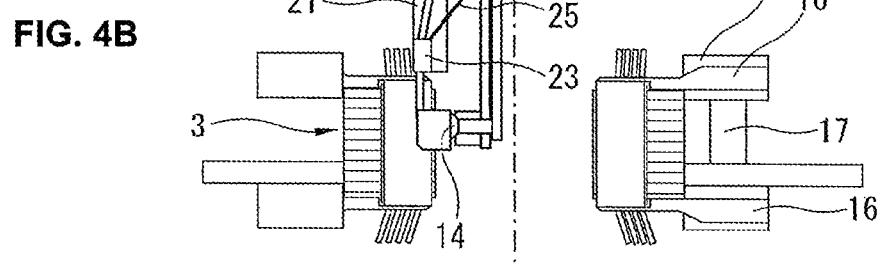
Figure 4C:
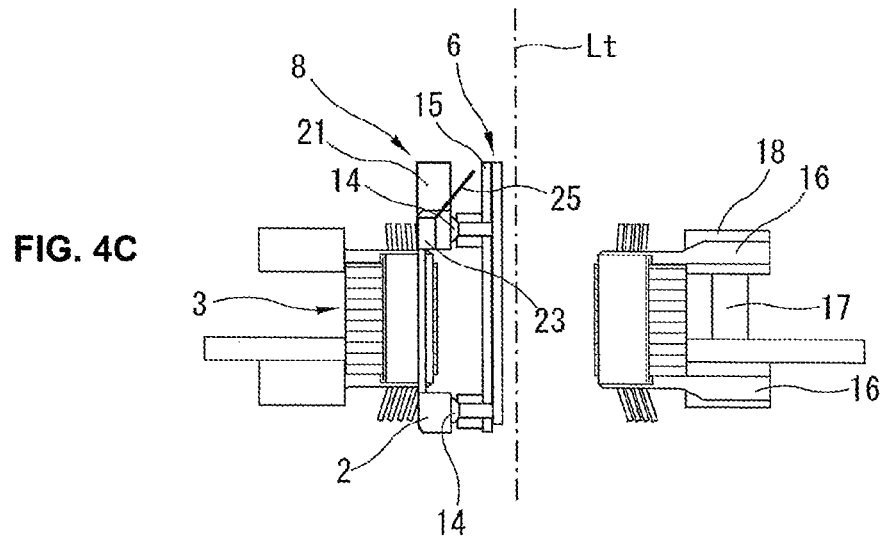

FIGS. 4A, 4B, and 4C are illustrative views chronologically showing movement of insertion jig 6 and guide jig 8 during processes for the insertion of interphase insulation paper 2 into stator core 3.

Insertion jig 6 suckingly holding the interphase insulation paper 2 is moved to a position above stator core 3 on support base 4 by insertion jig movement mechanism 7, and as shown in FIG. 4A, inserts interphase insulation paper 2 into guide jig 8 in parallel with stator core central axis Lt. As shown in FIG. 4B, interphase insulation paper 2 inserted in guide jig 8 is deformed into a predetermined shape upon passing through guide jig 8. Then, as shown in FIG. 4C, interphase insulation paper 2 that has passed through guide jig 8 is inserted into stator core 3 in parallel with stator core central axis Lt by insertion jig 6. In a state shown in FIG. 4C, each of legs 12 of interphase insulation paper 2 is disposed in a corresponding one of slots 10.

Insertion jig 6 includes a press-out plate 15 serving as a press-out mechanism structured to press interphase insulation paper 2 inserted in slots 10 of stator core 3, outwardly in a radial direction of stator core 3.

Figure 5A:
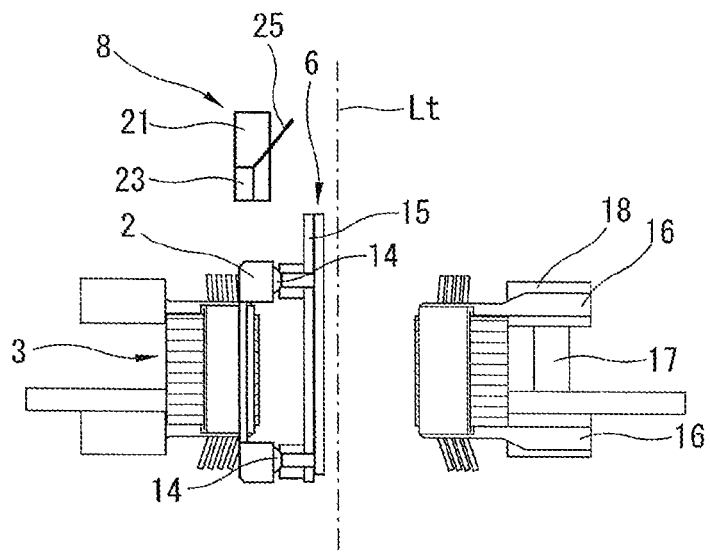
FIGS. 5A and 5B are illustrative views chronologically showing movement of the insertion jig and the guide jig during processes after the insertion of the interphase insulation paper into the stator core.
Figure 5B:
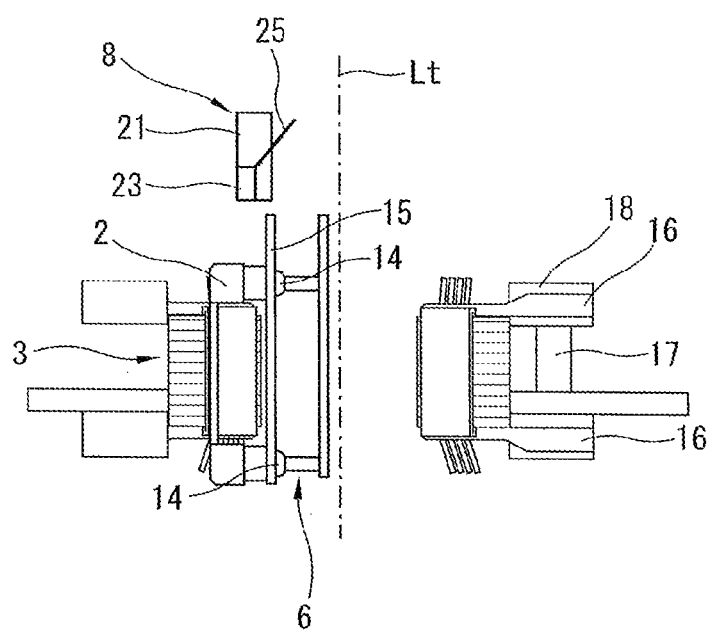

FIGS. 5A and 5B are illustrative views chronologically showing movement of insertion jig 6 and guide jig 8 during processes after the insertion of interphase insulation paper 2 into stator core 3.

After interphase insulation paper 2 has been inserted to a predetermined position in the direction of stator core central axis Lt in stator core 3, and guide jig 8 has been retracted upward to avoid interference with insertion jig 6 (see FIG. 5A), insertion jig 6 operates press-out plate 15 and presses interphase insulation paper 2 outwardly in the radial direction of stator core 3 (see FIG. 5B). This pressing of the interphase insulation paper 2 outward in the radial direction of stator core 3 by press-out plate 15 pushes legs 12 in slots 10 further into slots 10.

In FIGS. 4A to 5B, each of reference numerals 16 represents a cuff support jig described below. Each of reference numerals 17 represents a pallet serving as a holder that holds stator core 3. Each of reference numerals 18 represents a fixing member fixing the cuff support jig 16.

As shown in FIGS. 4A to 7, guide jig 8 is disposed at a predetermined position predeterminedly apart from first end face 3a of stator core 3 so as to face the first end face of stator core 3, upon the insertion of interphase insulation paper 2 into stator core 3 in parallel with stator core central axis Lt. In other words, guide jig 8 upon the insertion of interphase insulation paper 2 into stator core 3 is disposed adjacently to the first end face of stator core 3.

Figure 6:
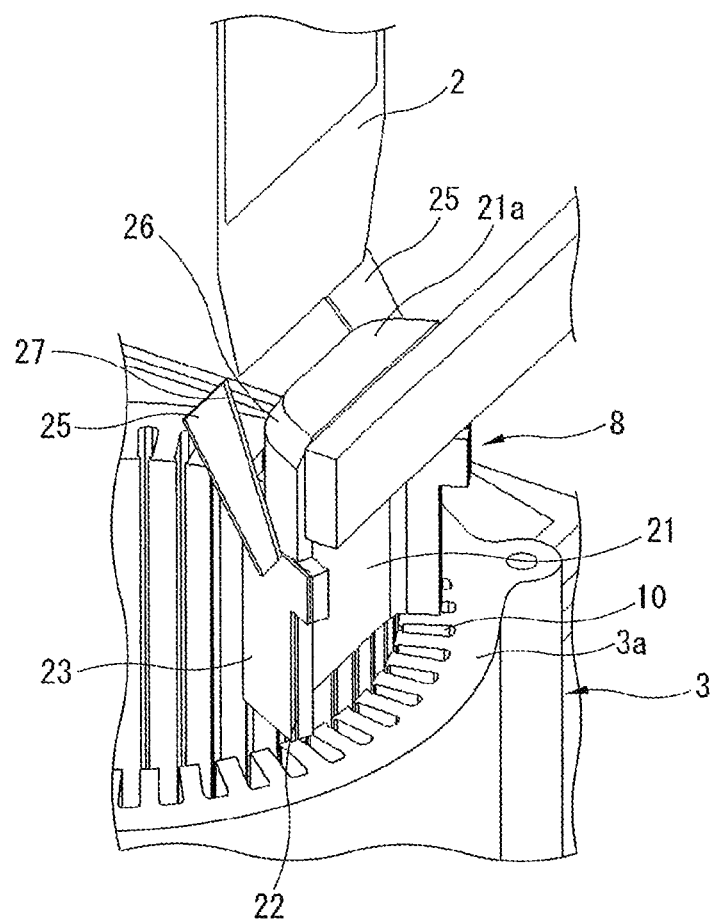
FIG. 6 is a perspective view of an insulation paper insertion device upon insertion of the interphase insulation paper into the guide jig.
Figure 7:
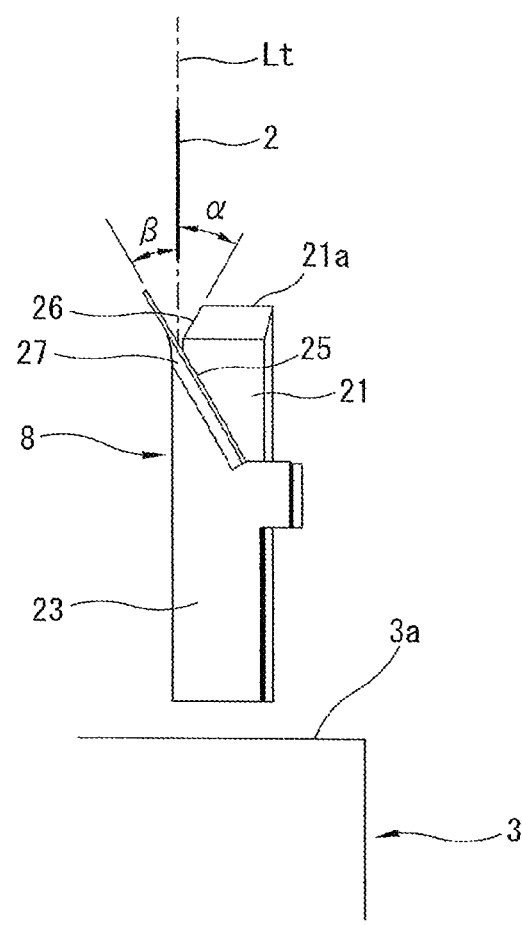
FIG. 7 is a side view of the insulation paper insertion device upon the insertion of the interphase insulation paper into the guide jig.

FIG. 6 is a perspective view of insulation paper insertion device 1 upon the insertion of interphase insulation paper 2 into guide jig 8. FIG. 7 is a side view of insulation paper insertion device 1 upon the insertion of interphase insulation paper 2 into guide jig 8.

Guide jig 8 serves for direct insertion of interphase insulation paper 2 into slots 10 in parallel with stator core central axis Lt.

Guide jig 8 causes interphase insulation paper 2 upon passing through guide jig 8 to deform into a predetermined substantially U-shape, such that interphase insulation paper 2 that has passed through guide jig 8 is guided into predetermined different two of slots 10 of stator core 3 simultaneously.

Thus, guide jig 8 receives interphase insulation paper 2 inserted from a first end of guide jig 8 in parallel with stator core central axis Lt, and deforms interphase insulation paper 2 passing through guide jig 8 into the predetermined shape. Then, guide jig 8 guides interphase insulation paper 2 that has passed through guide jig 8 and has been ejected from a second end of guide jig 8, into predetermined ones of slots 10 of stator core 3. In other words, guide jig 8 guides both side portions of an end of interphase insulation paper 2 (i.e. the both side portions of insulator 11) that has been ejected from the second end of guide jig 8, respectively and simultaneously into the different two of slots 10 of stator core 3.

As shown in FIGS. 4A to 11, guide jig 8 includes a body 21, and a pair of spacers 22 each of which is thicker than interphase insulation paper 2, and a pair of outer peripheral members 23 mounted to both sides of body 21 respectively via spacers 22.

Figure 8:
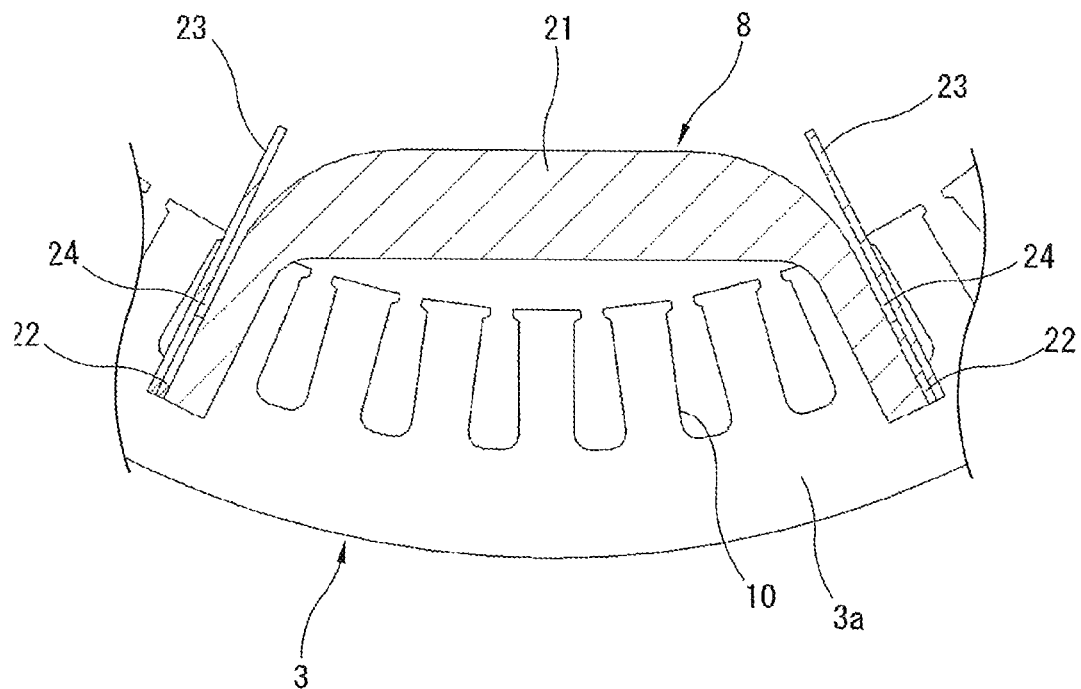
FIG. 8 is a cross sectional view along a line A-A in FIG. 1.
Figure 9:
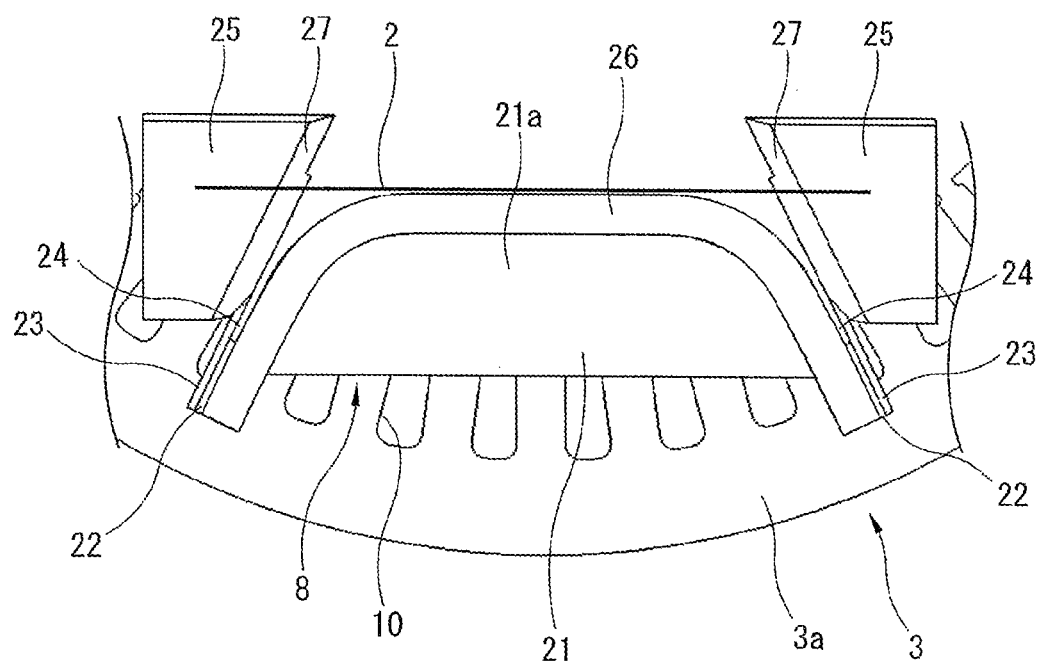
FIG. 9 is a plan view of the insulation paper insertion device immediately before the insertion of the interphase insulation paper into the guide jig.
Figure 10:
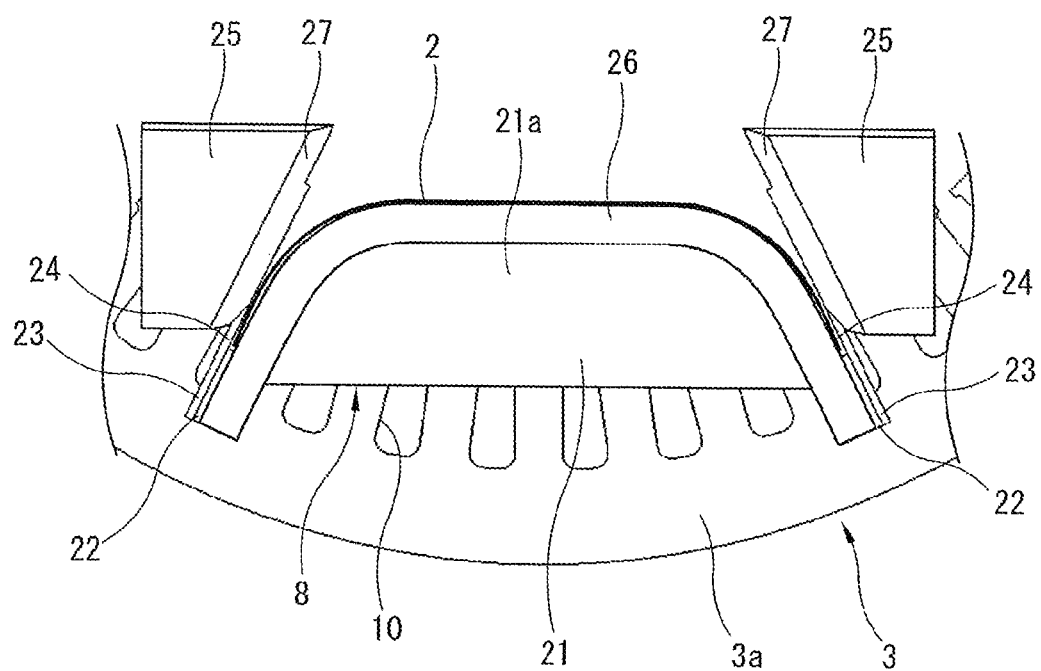
FIG. 10 is a plan view of the insulation paper insertion device after the insertion of the interphase insulation paper into the guide jig.
Figure 11:
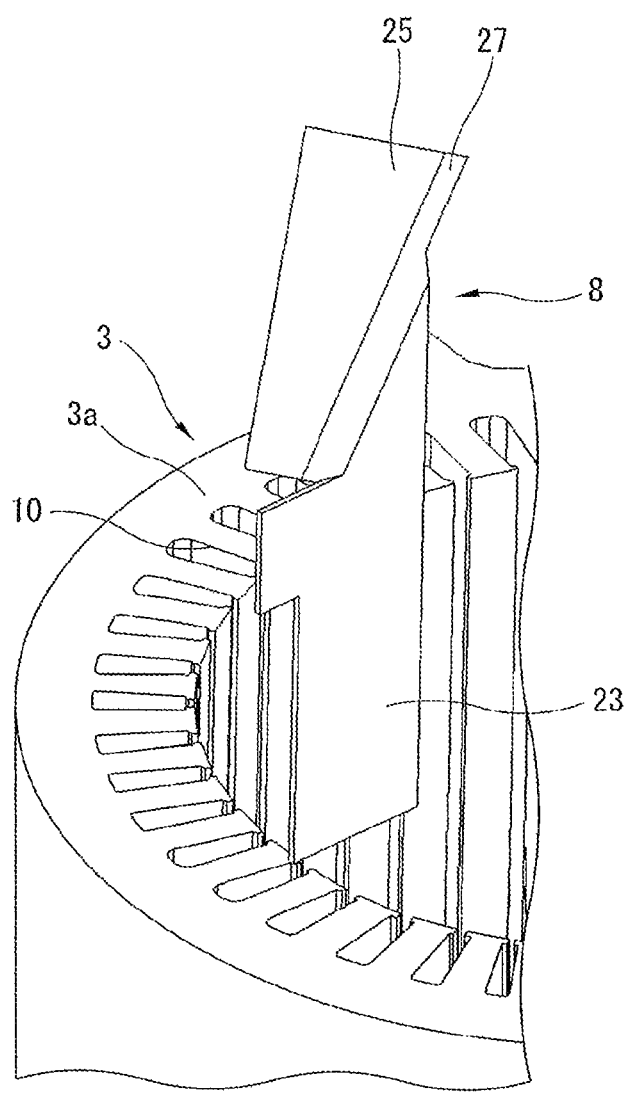
FIG. 11 is a perspective view of the guide jig.

FIG. 8 is a cross sectional view along a line A-A in FIG. 1. FIG. 9 is a plan view of insulation paper insertion device 1 immediately before the insertion of interphase insulation paper 2 into guide jig 8. FIG. 10 is a plan view of insulation paper insertion device 1 after the insertion of interphase insulation paper 2 into guide jig 8. FIG. 11 is a perspective view of guide jig 8.

Guide jig 8 includes a pair of gaps 24 formed between body 21 and outer peripheral members 23 due to thickness of spacers 22. Each of spacers 22 is a plate member having a thickness of approximately 1 mm, for example.

As shown in FIGS. 8 to 10, guide jig 8 is set such that in a state that guide jig 8 is located at the predetermined position to face the first end of stator core 3, each of gaps 24 in both sides of guide jig 8 overlaps with a corresponding one of the different two of slots 10 into which the both side portions of interphase insulation paper 2 are inserted.

Body 21 of guide jig 8 includes a first end face 21a formed in the first end of guide jig 8 and chamfered partially. In detail, as shown in FIG. 7, first end face 21a of body 21 includes a chamfered outer peripheral portion by which interphase insulation paper 2 passes through, wherein the chamfered outer peripheral portion includes an inclined face inclined at a predetermined angle α (e.g. 30°) with respect to stator core central axis Lt.

Thus, the chamfered portion 26 of first end face 21a of body 21 includes the inclined face inclined at the predetermined angle with respect to stator core central axis Lt, in order to guide interphase insulation paper 2 into guide jig 8.

Each of outer peripheral member 23 of guide jig 8 includes an insertion guide 25 formed by bending the guide jig 8 partially at the first end thereof. Accordingly, guide jig 8 includes a pair of insertion guides 25.

As shown in FIG. 9, guide jig 8 is greater in width than interphase insulation paper 2, in a region including the insertion guides 25.

Each of insertion guide 25 includes an inclined face inclined at a predetermined angle β (e.g. 30°) with respect to stator core central axis Lt.

Thus, each of insertion guide 25 includes the inclined face inclined at the predetermined angle with respect to stator core central axis Lt, in order to guide interphase insulation paper 2 into guide jig 8.

The both side portions of interphase insulation paper 2 are guided into gaps 24 due to chamfered portion 26 of first end face 21a of body 21 and insertion guides 25, and are inserted into gaps 24 as shown in FIG. 10.

In addition, as shown in FIGS. 6, 7, and 9 to 11, each of insertion guides 25 includes an inward face 27 rounded to reduce resistance upon the insertion of interphase insulation paper 2: e.g., rounded at a radius of curvature of 5 mm.

FIGS. 12A to 12F are illustrative views chronologically showing action processes of insulation paper insertion device 1 according to the embodiment described above.

Figure 12A:
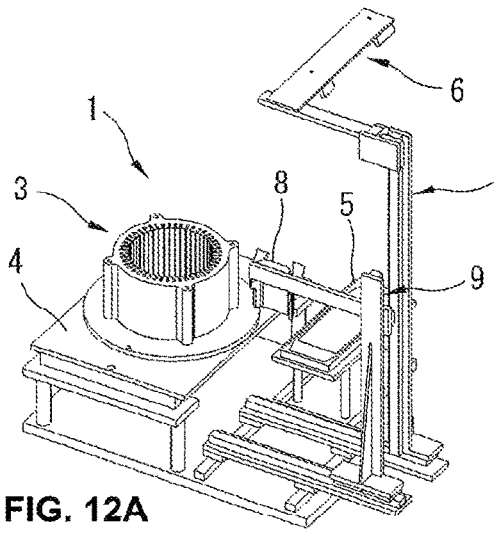
FIGS. 12A to 12F are illustrative views chronologically showing action processes of the insulation paper insertion device.

FIG. 12A shows an initial state in which insertion jig 6 and guide jig 8 are respectively at standby positions.

Figure 12B:
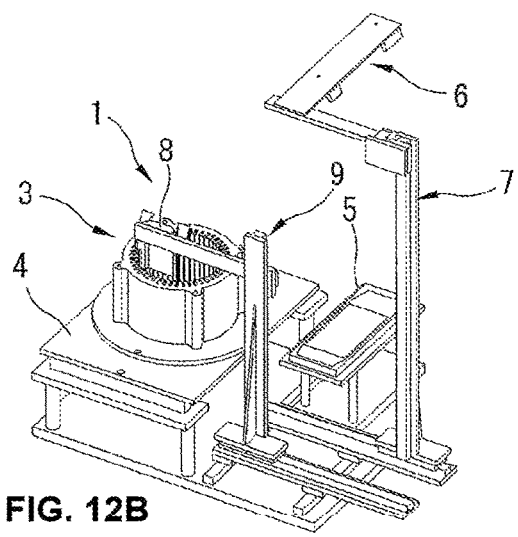

FIG. 12B shows a state in which guide jig movement mechanism 9 has operated from the state of FIG. 12A and has moved guide jig 8 to the predetermined position adjacent to the first end face of stator core 3.

Figure 12D:
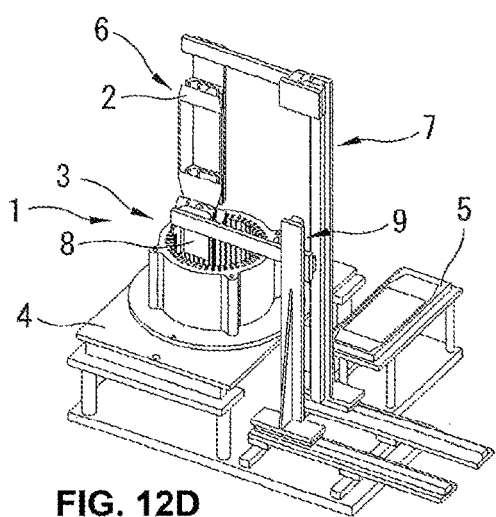
Figure 12C:
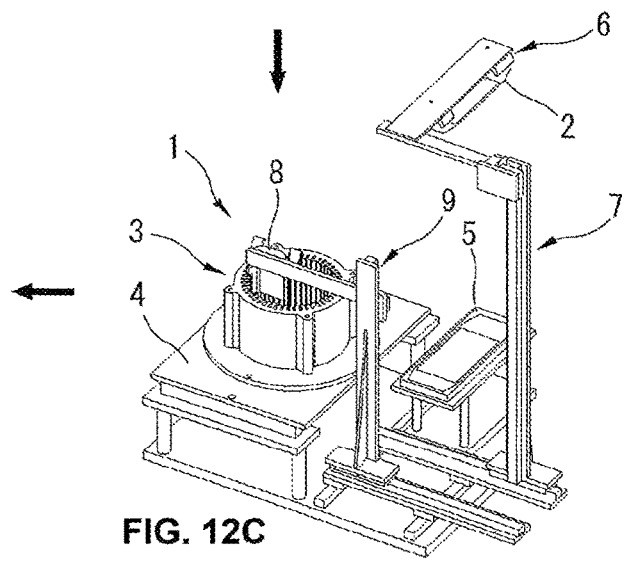

FIG. 12C shows a state in which insertion jig movement mechanism 7 has operated, and insertion jig 6 has brought out interphase insulation paper 2 from insulation paper storage case 5.

FIG. 12D shows a state in which insertion jig movement mechanism 7 has moved insertion jig 6 suckingly holding the interphase insulation paper 2 to a position in an inner circumferential side with respect to stator core 3.

Figure 12E:
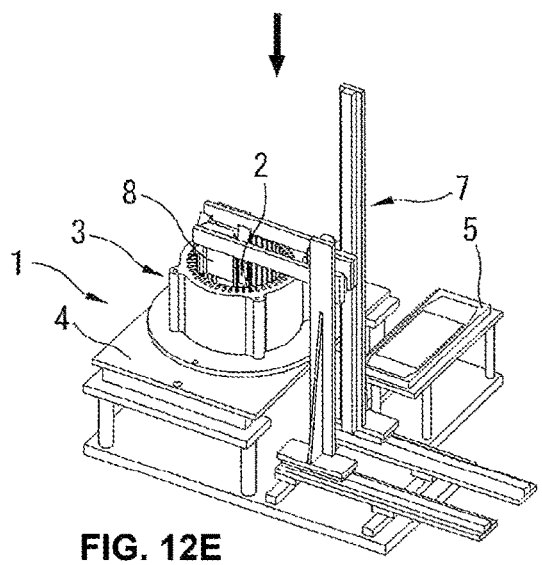

FIG. 12E shows a state in which interphase insulation paper 2 has been inserted in slots 10 of stator core 3 in parallel with stator core central axis Lt.

Figure 12F:
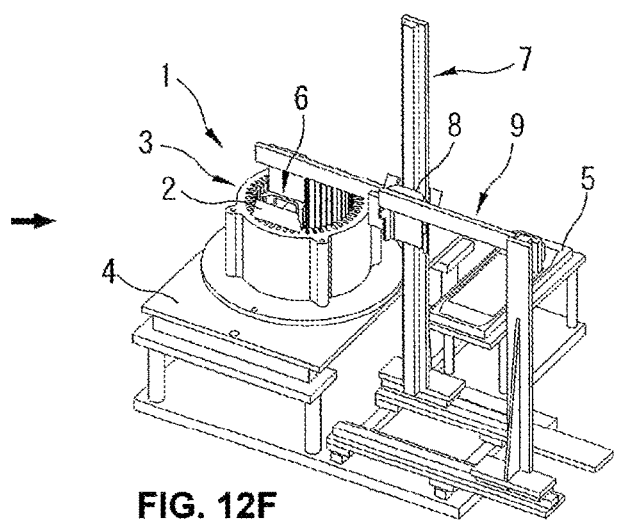

FIG. 12F shows a state in which guide jig 8 has returned to the standby position, and thereafter interphase insulation paper 2 inserted in slots 10 has been pressed outwardly in the radial direction of stator core 3.

Thus-configured insulation paper insertion device 1 is structured to insert interphase insulation paper 2 directly into stator core 3 by using the guide jig 8, and serves to insert interphase insulation paper 2 into stator core 3 accurately within a reduced time.

Specifically, this eliminates, in comparison with the prior art described above, time for setting the interphase insulation paper to the holder and insertion failure due to position displacement of the interphase insulation paper upon the setting to the holder, and thereby serves to improve production efficiency in total.

Furthermore, upon the insertion of interphase insulation paper 2 into guide jig 8 and then into stator core 3, insertion jig 6 suckingly holds the pair of insulators 11 being first and second ends of interphase insulation paper 2 in the direction of stator core central axis Lt. This serves to insert interphase insulation paper 2 into guide jig 8 and stator core 3 by insertion jig 6, certainly in a stable attitude.

Guide jig 8 includes chamfered portion 26 of first end face 21a of body 21 and insertion guides 25 each of which includes the inclined face inclined at the predetermined angle with respect to stator core central axis Lt, in order to guide interphase insulation paper 2 into guide jig 8. This serves to certainly insert interphase insulation paper 2 into gaps 24 of guide jig 8.

Each of insulators 11 is shaped to decrease in width toward its end by partially cutting off the both side portions of the end. Such shapes of the ends of insulators 11 serve to facilitate the insertion of interphase insulation paper 2 into gaps 24 of guide jig 8.

Opening 13 of interphase insulation paper 2 includes the four corners each of which is rounded. This serves to suppress interphase insulation paper 2 from being caught upon the insertion into guide jig 8, and facilitate the insertion into guide jig 8.

Insertion jig 6 includes press-out plate 15, which serves to certainly set the interphase insulation paper 2 to the slots. Insertion jig 6 structured to insert interphase insulation paper 2 into stator core 3 is also structured to push interphase insulation paper 2 further into slots 10. This eliminates a separate device or jig for pushing the interphase insulation paper 2 further into slots 10, and serves to improve productivity.

The drive source of insertion jig movement mechanism 7 and guide jig movement mechanism 9 is disposed outside of stator core 3. This allows insulation paper insertion device 1 to insert interphase insulation paper 2 into slots 10 of stator core 3 independently of a size of stator core 3.

Figure 13:
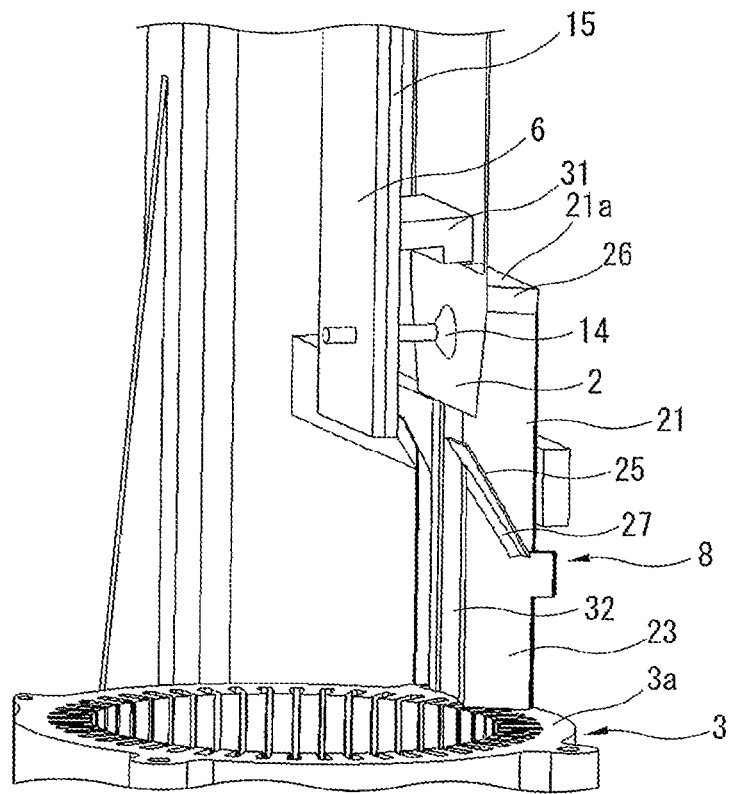
FIG. 13 is a perspective view schematically showing an insulation paper insertion device according to another embodiment.
Figure 14:
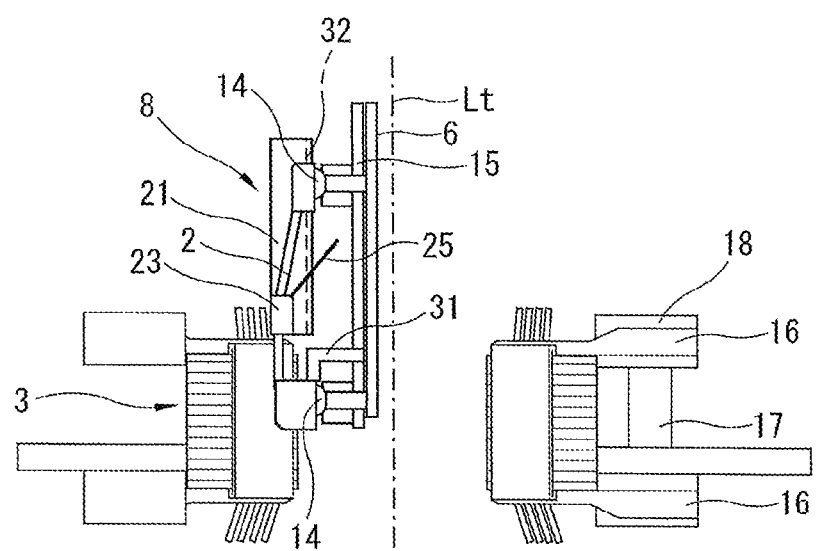
FIG. 14 is a side view schematically showing the insulation paper insertion device according to the another embodiment.

As shown in FIGS. 13 and 14, insertion jig 6 may include a hook 31 structured to hook the interphase insulation paper 2. In detail, insertion jig 6 may include hook 31 structured to hook the insulator 11 of interphase insulation paper 2 and push interphase insulation paper 2 in a direction of the insertion, upon the insertion of interphase insulation paper 2 into slots 10 of stator core 3.

Furthermore, as shown in FIGS. 13 and 14, guide jig 8 may include a groove 32 corresponding to hook 31 and extending over an entire length of guide jig 8 in the direction of stator core central axis Lt.

FIG. 13 is a perspective view schematically showing the insulation paper insertion device 1 with insertion jig 6 including hook 31 and guide jig 8 including groove 32. FIG. 14 is an illustrative view schematically showing the insulation paper insertion device 1 with insertion jig 6 including hook 31 and guide jig 8 including groove 32.

Hook 31 moves with movement of insertion jig 6, and pushes interphase insulation paper 2 while inserting the interphase insulation paper 2 into guide jig 8 and stator core 3. This serves to more certainly insert interphase insulation paper 2 held by insertion jig 6 into slots 10 of stator core 3.

In addition, groove 32 of guide jig 8 prevents hook 31 from contacting with body 21 of guide jig 8, in insulation paper insertion device 1.

Guide jig 8 shown in FIGS. 13 and 14 is increased in length of body 21 in the direction of stator core central axis Lt. In detail, first end face 21a of body 21 is positioned more apart from tops of insertion guides 25 in the direction of stator core central axis Lt.

In FIG. 14, reference numerals 16 represent the cuff support jigs described below. Reference numeral 17 represents the pallet serving as the holder that holds stator core 3. Reference numeral 18 represents the fixing member that fixes cuff support jig 16.

Figure 15:
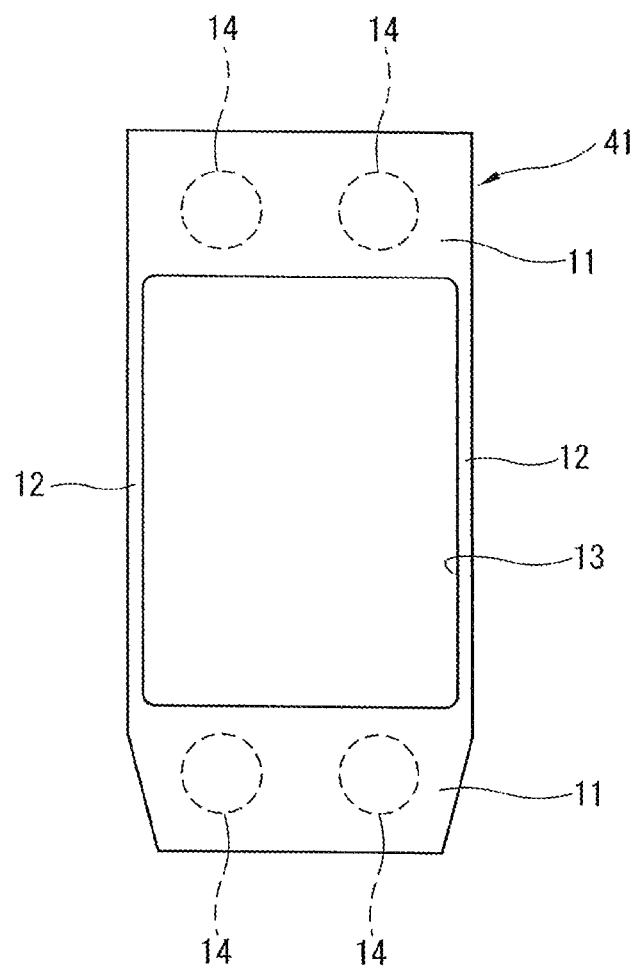
FIG. 15 is a plan view of an interphase insulation paper according to another embodiment.

The interphase insulation paper to be inserted into stator core 3 may be an interphase insulation paper 41 shaped as shown in FIG. 15.

Interphase insulation paper 41 in FIG. 15 is configured almost similarly to interphase insulation paper 2 described above, but merely one of insulators 11 of interphase insulation paper 41 is shaped to decrease in width toward its end.

The insulator 11 shaped to decrease in width toward its end is inserted first, upon insertion of interphase insulation paper 41 into guide jig 8.

As shown in FIG. 15, each of insulators 11 may be sucked and held by two of vacuum pads 14. Alternatively, interphase insulation paper 41 may be held such that each of insulators 11 is sucked and held by one of vacuum pad 14.

Figure 16:
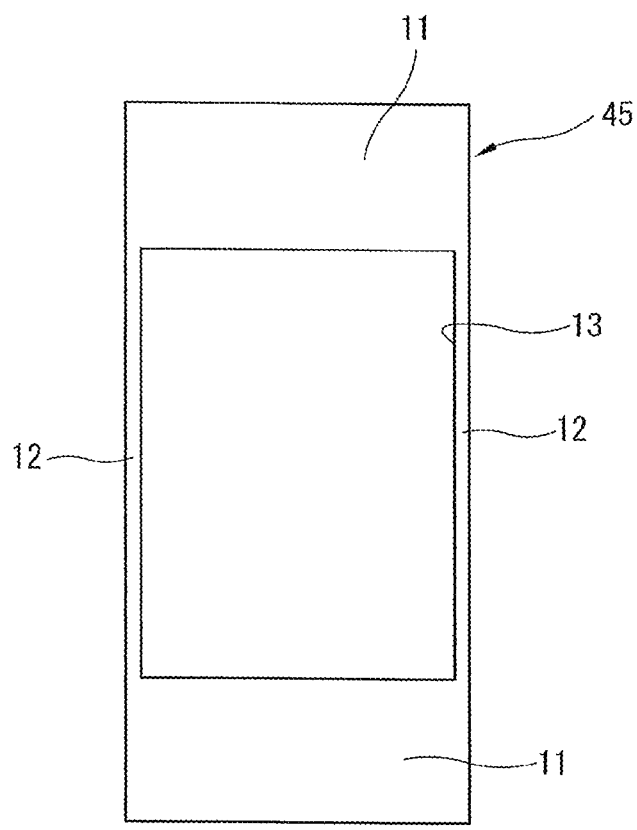
FIG. 16 is a plan view of an interphase insulation paper according to still another embodiment.

The interphase insulation paper to be inserted into stator core 3 may be an interphase insulation paper 45 shaped as shown in FIG. 16.

Interphase insulation paper 45 in FIG. 16 is configured almost similarly to interphase insulation paper 2 described above. However, each of insulators 11 of interphase insulation paper 45 is not shaped to decrease in width toward its end but shaped rectangular. Furthermore, opening 13 of interphase insulation paper 45 includes four corners each of which is not rounded but is angular.

Figure 17:
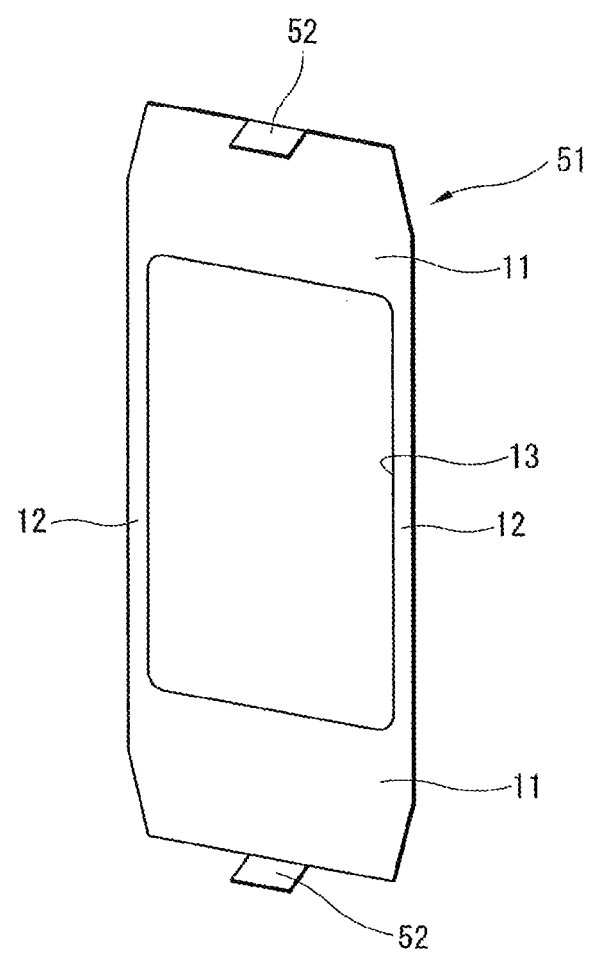
FIG. 17 is a plan view of an interphase insulation paper according to still another embodiment.

The interphase insulation paper to be inserted into stator core 3 may be an interphase insulation paper 51 including projections 52 as shown in FIG. 17.

Figure 18:
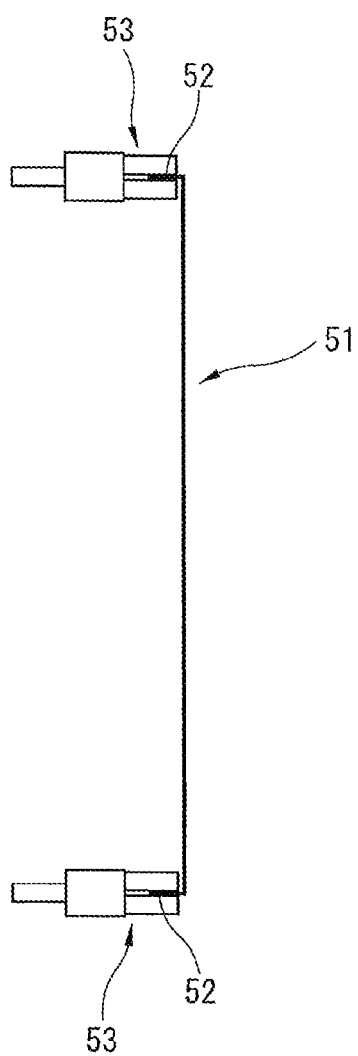
FIG. 18 is an illustrative view schematically showing a robot hand that the insertion jig includes in case of holding the interphase insulation paper by grasping.

In case of employing the interphase insulation paper 51, insertion jig 6 may include robot hands 53 as shown in FIG. 18 in place of vacuum pads 14, so as to grasp projections 52 with robot hands 53.

Interphase insulation paper 51 is configured almost similarly to interphase insulation paper 2 described above, but each of insulators 11 of interphase insulation paper 51 includes projection 52. Insertion jig 6 holds interphase insulation paper 51 by holding the projections 52 with robot hands 53.

Each of projections 52 may be formed by bending beforehand to facilitate the grasp with robot hands 53 of insertion jig 6.

Thus, interphase insulation paper 51 may be certainly held with insertion jig 6, by grasping the projections 52 of insulators 11 with insertion jig 6.

Although FIGS. 17 and 18 show an example in which each of insulators 11 includes one of projection 52, each of insulators 11 may include a plurality of projections 52. In such case, insertion jig 6 may include robot hands 53 corresponding in number to projections 52, so as to grasp all of projections 52.

Figure 19:
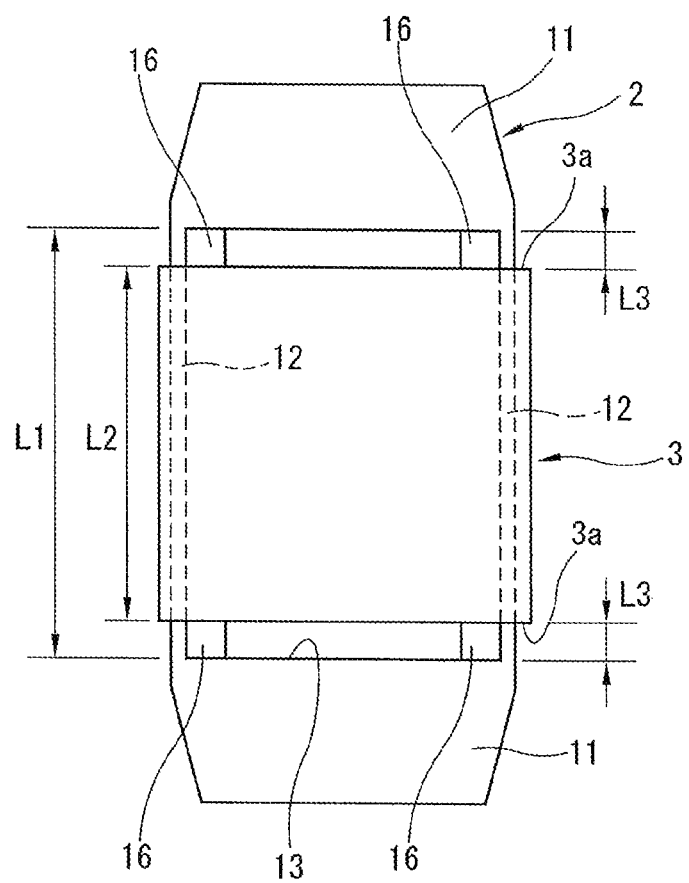
FIG. 19 is an illustrative view schematically showing relation between the interphase insulation paper and cuff support jigs.

As shown in FIG. 19, each of legs 12 of interphase insulation paper 2 may have a length in the direction of stator core central axis Lt, in view of cuff support jigs 16 being support jigs holding the stator core 3.

Specifically, each of legs 12 of interphase insulation paper 2 may have length L1 shorter than a sum of a length L2 of stator core 3 and lengths L3 of cuff support jigs 16 of the first and second end faces of stator core 3, in the direction of stator core central axis Lt. In other words, each of legs 12 may be formed to satisfy a condition of L1<L2+L3+L3. The length of each cuff support jig 16 in the direction of stator core central axis Lt is equivalent to a thickness of each cuff support jig 16.

Figure 20:
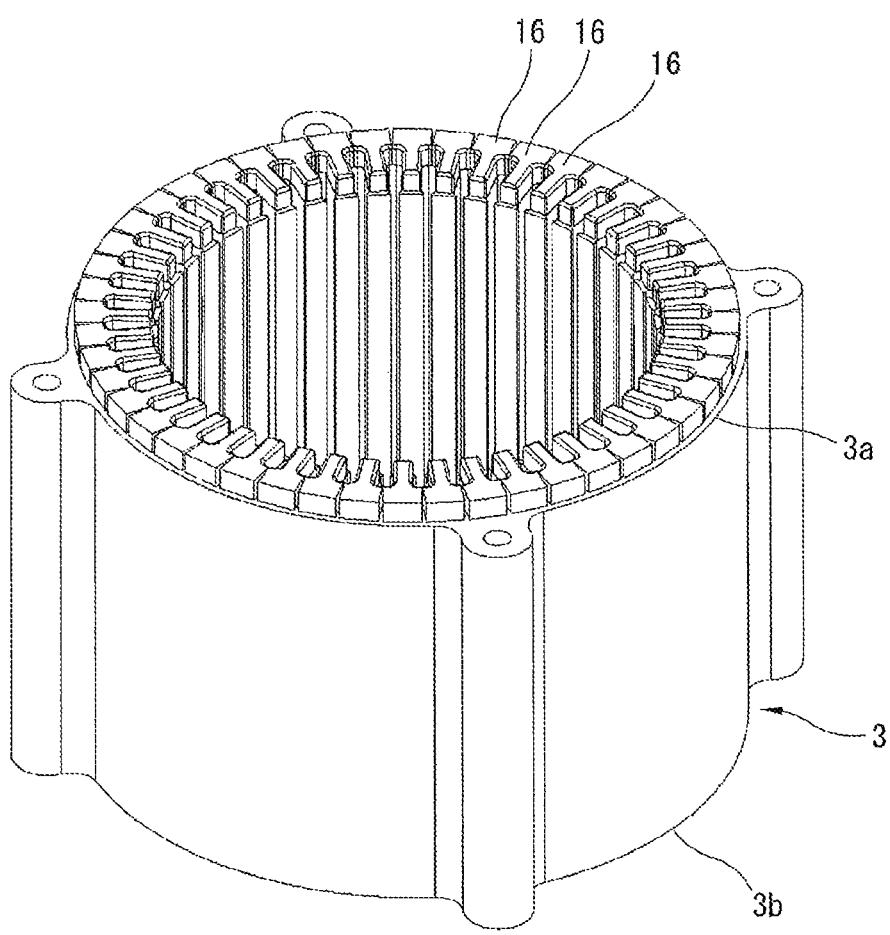
FIG. 20 is a perspective view of the stator core and the cuff support jigs.
Figure 21:
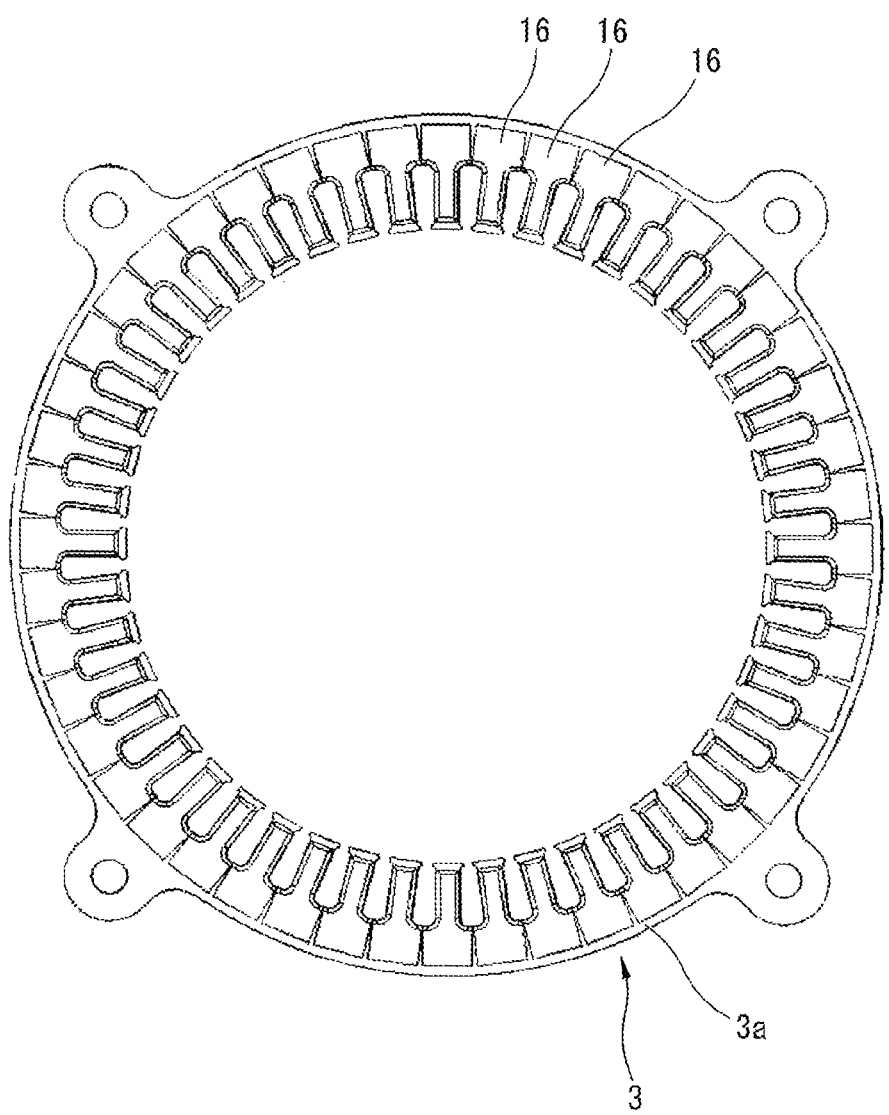
FIG. 21 is a plan view of the stator core including an end face covered by the cuff support jigs.

As shown in FIGS. 19 to 21, each of cuff support jigs 16 is a substantially T-shaped member disposed between slots 10. Cuff support jigs 16 are disposed at the first and second end faces of stator core 3 such that each of the first and second end faces of stator core 3 is covered by cuff support jigs 16.

Cuff support jigs 16 are structured to hold an interphase insulation paper inserted in ones of slots 10 different from ones of slots 10 into which interphase insulation paper 2 is inserted. Each of cuff support jigs 16 includes a chamfered face facing the inner circumferential side with respect to stator core 3, for smooth mounting of the coils of respective phases to the slots.

Figure 22:
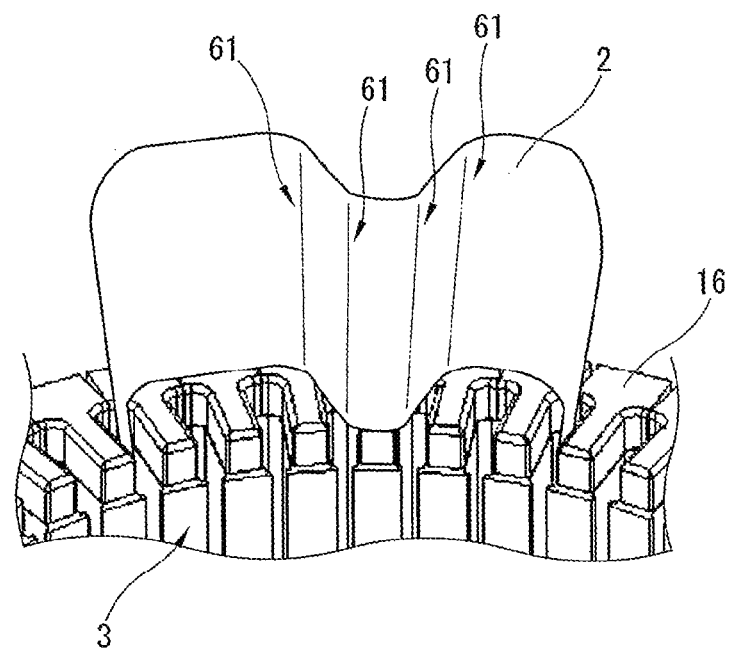
FIG. 22 is a perspective view of the stator core in which the interphase insulation paper antecedently creased is inserted.
Figure 23:
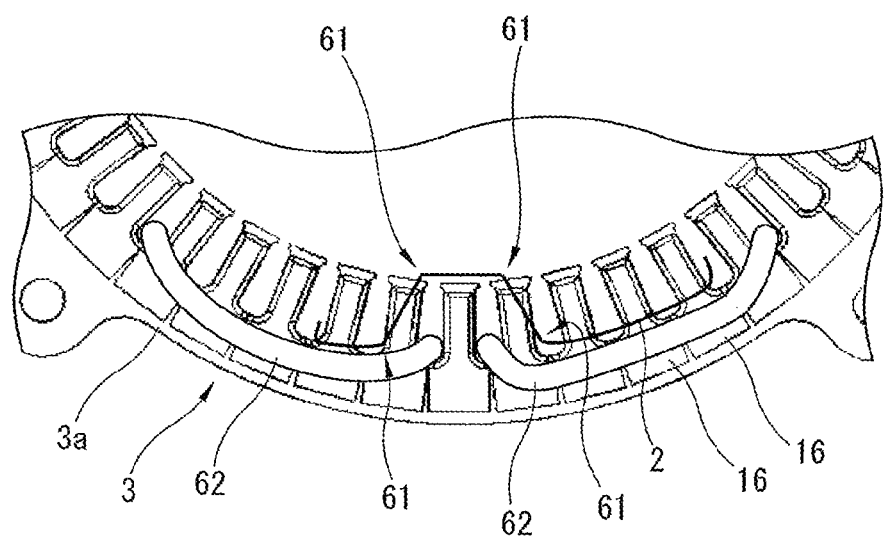
FIG. 23 is a plan view of the stator core in which the interphase insulation paper antecedently creased is inserted.

As shown in FIGS. 22 and 23, insulator 11 of interphase insulation paper 2 may be creased beforehand to include creases 61.

Creases 61 are formed in conformance with shapes of coil ends 62 of the coils inserted in stator core 3. Such creases 61 allow the insulator 11 of interphase insulation paper 2 to be disposed along the shapes of the coil ends.

Figure 24:
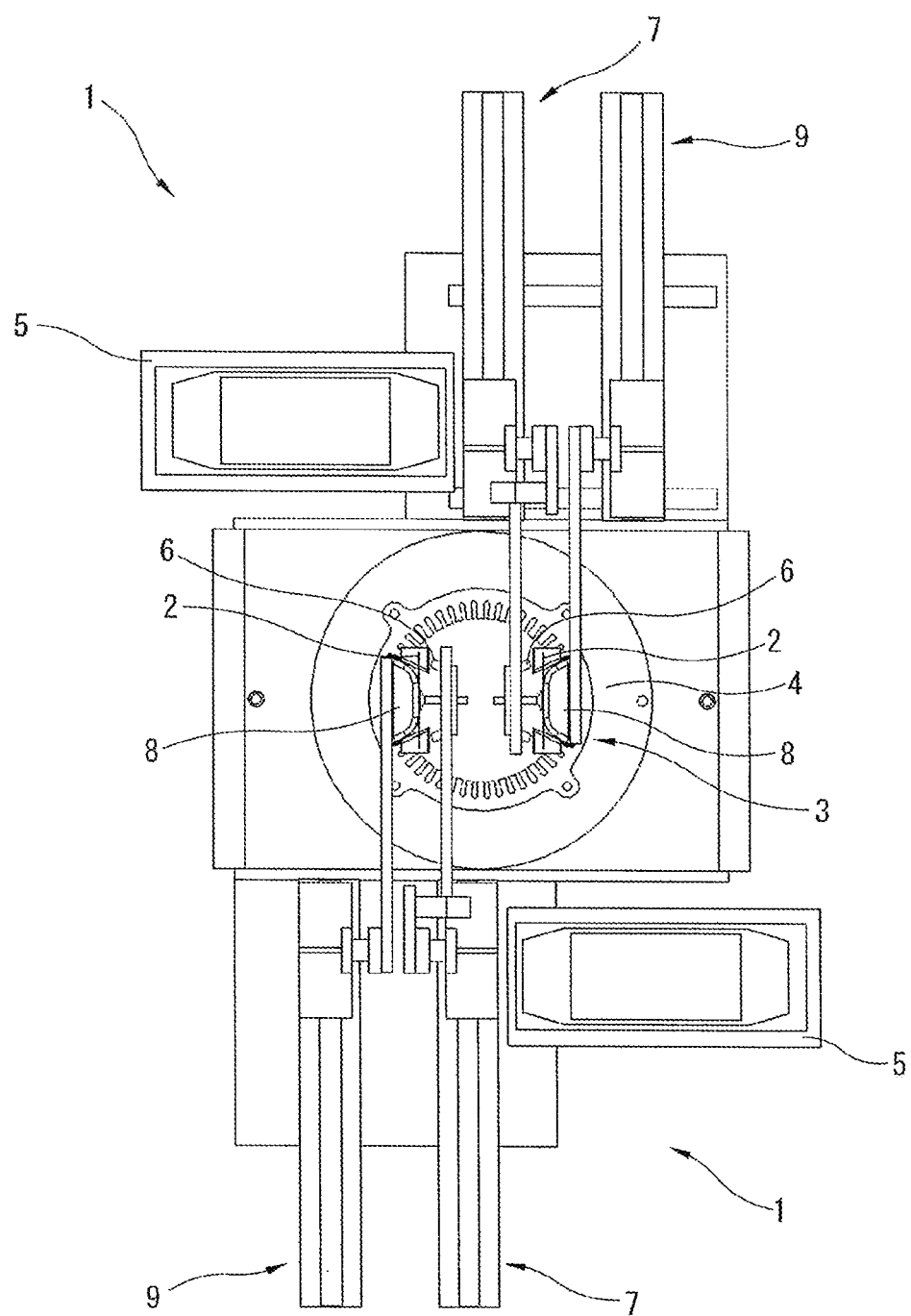
FIG. 24 is an illustrative view schematically showing an embodiment in which two of the insulation paper insertion device are disposed outside the stator core.

As shown in FIG. 24, stator core 3 is provided with two of insulation paper insertion devices 1 disposed outside of stator core 3. In other words, stator core 3 is provided with a plurality of insulation paper insertion devices 1 disposed outside of stator core 3.

The configuration of disposing the plurality of insulation paper insertion devices 1 outside of stator core 3 allows a plurality of interphase insulation papers 2 to be simultaneously inserted into stator core 3. Simultaneously inserting the plurality of interphase insulation papers 2 into stator core 3 reduces assembly time in comparison with a case of inserting the interphase insulation papers 2 one by one into stator core 3, and serves to further improve the productivity.

Each of the embodiments described above relates to an electric motor manufacturing method and an electric motor manufacturing device.

The invention claimed is:

1. A method for manufacturing an electric motor including a stator core and an interphase insulation paper, wherein the stator core includes an inner periphery to which coils for respective phases are mounted and includes slots formed in the inner periphery, and wherein the interphase insulation paper is structured to perform insulation between the coils in their coil ends disposed outside with respect to first and second end faces of the stator core in a direction of a stator core central axis, and wherein the interphase insulation paper is inserted into the slots of the stator core by using a guide jig, the method comprising:
   disposing the guide jig at a predetermined position to face the first end face of the stator core during the insertion of the interphase insulation paper into the slots of the stator core;
   inserting the interphase insulation paper into the guide jig in parallel with the stator core central axis;
   deforming the interphase insulation paper passing through the guide jig into a predetermined shape; and
   inserting both side portions of the interphase insulation paper that has passed through the guide jig, respectively and simultaneously into different two of the slots of the stator core, in parallel with the stator core central axis.

2. The method as claimed in claim 1, the method further comprising:
   holding first and second ends of the interphase insulation paper in the direction of the stator core central axis by using an insertion jig, upon the insertion of the interphase insulation paper into the guide jig.

3. The method as claimed in claim 2, wherein:
   the interphase insulation paper includes a pair of insulators and a pair of legs;
   the pair of insulators are apart from each other, and are structured to perform the insulation between the coils in the coil ends at the first and second end faces of the stator core;
   the pair of legs are apart from each other, and couple the pair of insulators; and
   the insertion jig holds at least one portion of each of the pair of insulators.

4. The method as claimed in claim 3, wherein:
   at least one of the pair of insulators includes a projection; and
   the insertion jig holds the at least one of the pair of insulators by holding the projection.

5. The method as claimed in claim 3, wherein:
   the interphase insulation paper is formed such that at least one of the pair of insulators is shaped to decrease in width toward an end thereof by partially cutting off both side portions of the end.

6. The method as claimed in claim 3, wherein:
   the interphase insulation paper includes an opening surrounded by the pair of insulators and the pair of legs;
   the opening includes junctions at each of which one of the pair of insulators and one of the pair of legs of the interphase insulation paper are connected to each other; and
   each of the junctions is curved to be convex outwardly at a predetermined curvature.

7. The method as claimed in claim 3, wherein at least one of the pair of insulators of the interphase insulation paper is creased beforehand in conformance with shapes of the coil ends.

8. The method as claimed in claim 3, wherein:
   each of the first and second end faces of the stator core is supported by a cuff support jig, upon the insertion of the interphase insulation paper into the stator core; and
   each of the pair of legs of the interphase insulation paper has a length shorter than a sum of a length of the stator core and lengths of the cuff support jigs of the first and second end faces of the stator core, in the direction of the stator core central axis.

9. The method as claimed in claim 2, wherein the insertion jig includes a hook structured to hook the interphase insulation paper upon the insertion of the interphase insulation paper.

10. The method as claimed in claim 2, wherein the insertion jig includes a press-out mechanism structured to press the interphase insulation paper inserted in the slots of the stator core, outwardly in a radial direction of the stator core.

11. The method as claimed in claim 2, the method further comprising:

disposing a drive source of a jig movement mechanism outside the stator core, wherein the jig movement mechanism is structured to dispose the guide jig at the predetermined position to face the first end face of the stator core and move the insertion jig in parallel with the stator core central axis.

12. The method as claimed in claim 11, the method further comprising:

disposing outside the stator core a plurality of insulation paper insertion devices each of which includes the guide jig, the insertion jig, and the jig movement mechanism.

13. The method as claimed in claim 1, wherein:

the guide jig includes an inclined face inclined at a predetermined angle with respect to the stator core central axis in order to guide the interphase insulation paper into the guide jig; and the inclined face is formed in a first end of the guide jig from which the interphase insulation paper is inserted into the guide jig.

14. A device for manufacturing an electric motor including a stator core and an interphase insulation paper, wherein the stator core includes an inner periphery to which coils for respective phases are mounted and includes slots formed in the inner periphery, and wherein the interphase insulation paper is structured to perform insulation between the coils in their coil ends disposed outside with respect to first and second end faces of the stator core in a direction of a stator core central axis, and wherein the interphase insulation paper is structured to be inserted into the slots of the stator core through a guide jig disposed at a predetermined position to face the first end face of the stator core, the device comprising:

the guide jig structured to receive the interphase insulation paper inserted into the guide jig in parallel with the stator core central axis, and deform the interphase insulation paper passing through the guide jig into a predetermined shape, such that both side portions of the interphase insulation paper that has passed through the guide jig are inserted respectively and simultaneously into different two of the slots of the stator core, in parallel with the stator core central axis; and an insertion jig structured to hold first and second ends of the interphase insulation paper in the direction of the stator core central axis, upon the insertion of the interphase insulation paper into the guide jig.

15. A method for manufacturing an electric motor including a stator core and an interphase insulation paper, wherein the stator core includes an inner periphery to which coils for respective phases are mounted and includes slots formed in the inner periphery, and wherein the interphase insulation paper is structured to perform insulation between the coils in their coil ends disposed outside with respect to first and second end faces of the stator core in a direction of a stator core central axis, and wherein the interphase insulation paper is inserted into the slots of the stator core by using a guide jig, the method comprising:

disposing the guide jig at a predetermined position to face the first end face of the stator core;

inserting the interphase insulation paper into the guide jig in parallel with the stator core central axis;

deforming the interphase insulation paper passing through the guide jig into a predetermined shape;

inserting both side portions of the interphase insulation paper that has passed through the guide jig, respectively and simultaneously into different two of the slots of the stator core, in parallel with the stator core central axis; and holding first and second ends of the interphase insulation paper in the direction of the stator core central axis by using an insertion jig, upon the insertion of the interphase insulation paper into the guide jig.

* * * * *